United States Patent [19]

Vokurka

[11] Patent Number: 4,721,844

[45] Date of Patent: Jan. 26, 1988

[54] ELECTRIC ARC WELDING PROCESS FOR FILLING A WELD GROOVE TO A PREDETERMINED EXTENT

[76] Inventor: Franz Vokurka, Minorgasse 60, 1140 Wien, Austria

[21] Appl. No.: 836,444

[22] Filed: Mar. 5, 1986

[51] Int. Cl.[4] .............................................. B23K 9/12
[52] U.S. Cl. ........................ 219/137 PS; 219/124.02; 219/124.32; 219/130.21; 219/137.71
[58] Field of Search ..................... 219/137 PS, 130.21, 219/137.71, 124.02, 124.03, 136, 130.31, 130.32

[56] References Cited

U.S. PATENT DOCUMENTS

| | | | |
|---|---|---|---|
| 3,612,818 | 10/1971 | Bechtle | 219/137.71 |
| 4,000,374 | 12/1976 | De Keyser | |
| 4,005,308 | 1/1977 | Chaney et al. | 219/130.21 |
| 4,302,655 | 11/1981 | Edling | |
| 4,302,656 | 11/1981 | Poth et al. | 219/124.02 |
| 4,326,155 | 4/1982 | Griebeler | |

FOREIGN PATENT DOCUMENTS

| | | |
|---|---|---|
| 0078252 | 12/1983 | European Pat. Off. |
| 3010422 | 9/1982 | Fed. Rep. of Germany |
| 2005049 | 4/1979 | United Kingdom |

OTHER PUBLICATIONS

"National Swedish Board for Technical Development", New Swedish Technology, vol. 1, No. 1, 1981, pp. 1–3.

Primary Examiner—Clifford C. Shaw
Attorney, Agent, or Firm—Young & Thompson

[57] ABSTRACT

In order to maintain the degree of filling of weld seams constant, especially those seams having a changing size of the cross section of the weld groove, in arc welding, the spacing of the welding gun from the workpiece is kept constant, the welding amperage and/or the welding voltage are measured, and the thus-measured value for the welding amperage or the welding voltage, respectively, is compared with a predetermined set value corresponding to the desired degree of filling. In case of a deviation of the measured value from the predetermined set value, the welding speed and/or the welding output are changed correspondingly.

6 Claims, 1 Drawing Figure

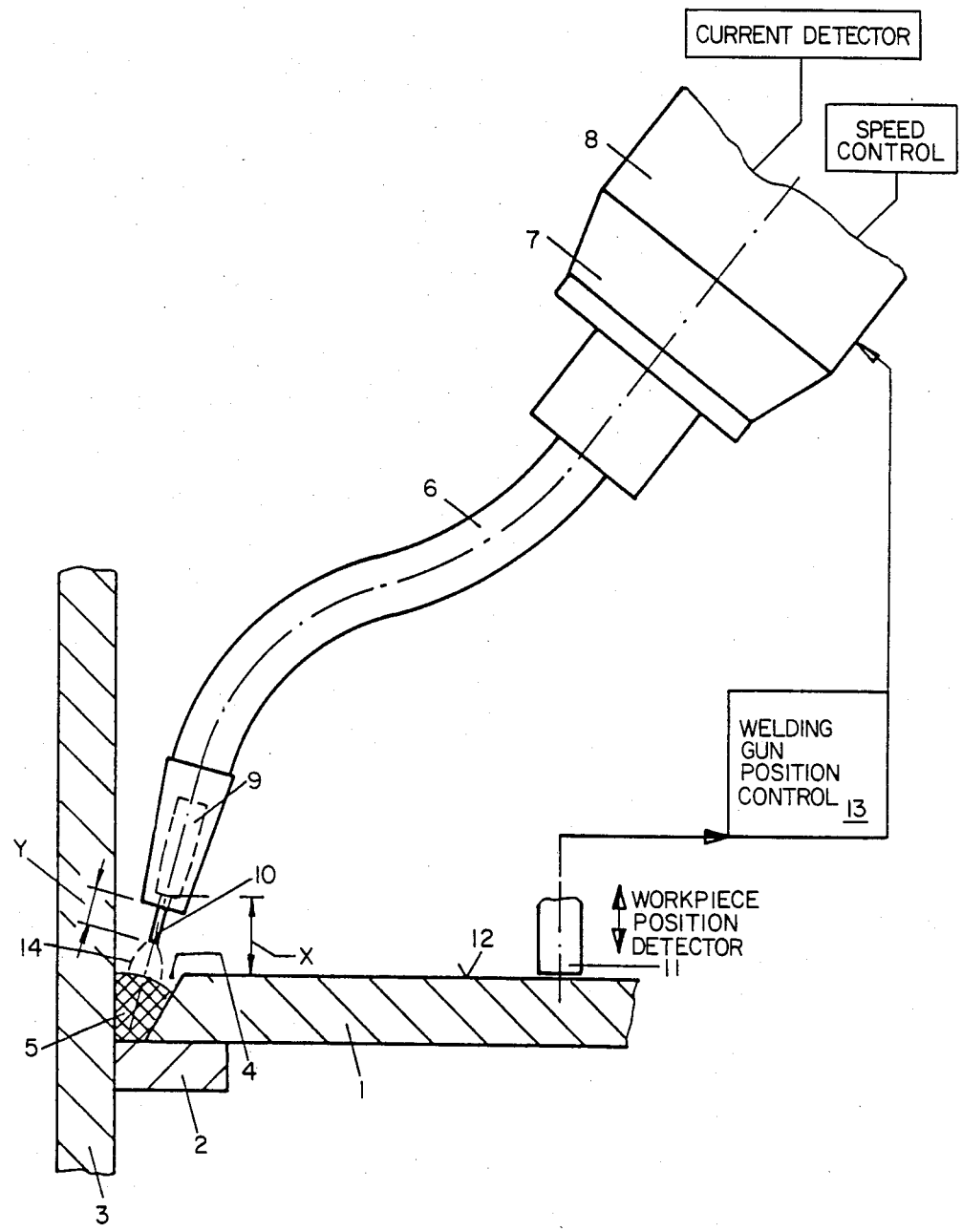

ELECTRIC ARC WELDING PROCESS FOR FILLING A WELD GROOVE TO A PREDETERMINED EXTENT

BACKGROUND OF THE INVENTION

1. Field of the Invention

The invention relates to a process for arc welding wherein the welding amperage and/or the welding voltage are measured, the measured value for the welding amperage or the welding voltage, respectively, is compared with a predetermined set value for amperage or voltage, respectively, and is altered in case of a deviation of the measured value from the predetermined set value.

In automatic arc welding, it is difficult to maintain the extent of filling the weld seam constant if the cross section of the weld groove, i.e. the groove width and/or depth, is subject to variation. A dimensionally accurate preparation of the workpiece edges is frequently impossible under practical conditions, or entails excessively high manufacturing expenses.

2. Description of the Related Art

It has been suggested to optically detect the degree of filling of the weld groove during arc welding and to change, with the aid of the data determined therefrom, the welding parameters so that a constant extent of filling the weld groove is achieved. However, this method has not as yet achieved practical utilization on account of the difficulties occurring in the optical detection of the degree of filling.

It is furthermore known from Austrian patent No. 362,976 and DOS No. 2,645,788 to measure the welding current in order to control welding installations, and to employ changes in welding current and/or deviations of the latter from a predetermined desired value for the control of weld seams. Heretofore, no disclosures have been directed toward controlling welding installations based on measurement of the welding current in such a way that the degree of filling of weld grooves is maintained at a constant value.

In the arc welding process described in U.S. Pat. No. 4,302,655, the electrode is reciprocated (oscillated) transversely to the weld groove between the workpieces, the welding current and/or the welding voltage being measured at two different points of the reciprocating movement and these values being compared with a precalculated value corresponding to the desired extent of filling. It is moreover set forth in U.S. Pat. No. 4,302,655 that it is conventional to adapt the welding parameters to the groove or, in other words, to regulate the welding parameters in an adapting fashion. These welding parameters are ordinarily the electrode speed, the amperage, the wire feeding speed, the voltage and, in case of oscillation, the amplitude. U.S. Pat. No. 4,302,655 does not contain any suggestion for maintaining the distance of the welding gun from the workpiece at a constant value.

British Laid-Open application No. 2,005,049 describes a process for detecting and optimizing the mechanical properties, such as curvature and/or shape of a weld seam. In this method, inter alia, the spacing between the welding gun and the workpiece and the like is determined and optimized. In British Laid-Open application No. 2,005,049, these mechanical data are detected by sensors. The data detected by the sensors are converted into electrical signals which latter are utilized by way of several intermediate stages for controlling the welding parameters in that they form optimized absolute values for regulating the welding process.

British Laid-Open application No. 2,005,049 proposes to associate the welding gun with a feeler (see left-hand portion of FIG. 2). This feeler is used, inter alia, for measuring the height of the workpieces. Since the feeler is merely intended for picking up the actual height of the workpieces W and W1, British Laid-Open application No. 2,005,049 does not contain any hints, either, to the effect that the welding gun (B$^r$ in the right-hand portion of FIG. 2) is to have a constant distance from the workpieces. Moreover, the suggestion in British Laid-Open application No. 2,005,049 has the drawback that the feeler is located at a spacing from the welding gun so that the feeler cannot carry out its measurements where the welding gun is at a particular point in time.

SUMMARY OF THE INVENTION

Accordingly, the invention is based on the object of indicating a process of the type discussed hereinabove which can be conducted in a simple way and makes do with values that are normally picked up anyway during arc welding.

This is achieved according to the invention by maintaining the spacing of the welding gun from the workpiece at a constant value and by increasing the welding output and/or reducing the welding speed if the measured value for the amperage or the voltage, respectively, lies below a set value predetermined in correspondence with the desired degree of filling of the weld groove, and vice versa, with the provision that in case of a change in welding output, the set value for the welding current is likewise altered correspondingly.

The invention starts with the realization that, with a constant spacing of the welding gun and/or of the contact tip thereof from the workpiece, the welding current is in a direct relationship to the extent of filling of the weld groove. This holds true for the case wherein a weld groove is filled up entirely with welding material in one welding step, as well as for those cases wherein, for example, relatively large weld grooves are filled with welding material in two or more successive welding steps. The essential advantage of the invention results from the fact that the arc physics proper are utilized for control purposes. This eliminates, on the one hand, additional devices as required in the conventional processes and, on the other hand, provides measurement directly at the point where the welding gun is located at a particular time.

The procedure within the scope of this invention will ordinarily be such that the welding voltage is measured as a characteristic variable for the degree of filling of the weld groove and is compared with a set value predetermined in correspondence with the welding parameters selected.

In the process of this invention, the amount of material released into the weld groove can be varied by raising or reducing the speed at which the welding gun moves alongside the seam, and likewise by changing the welding output (for example by altering the wire feeding speed) but during this step a corresponding correction of the predetermined set values must be performed simultaneously. It is readily understood that the two aforedescribed steps can also be executed at the same time.

In order to maintain the spacing of the welding gun from the workpiece at a constant value, it may be necessary to associate with the welding gun feeler rollers or initiators (proximity switches and the like) which detect characteristic edges or surface areas of the workpiece to be processed and control corresponding movements of the welding gun, the latter being carried, for example, by an industrial robot.

BRIEF DESCRIPTION OF THE DRAWINGS

The drawing shows an arrangement for performing the process of this invention in a schematic view.

DESCRIPTION OF THE PREFERRED EMBODIMENT

The workpieces 1, 2 and 3 to be welded together define a weld groove 4 which is filled with welding material 5; in the illustrated example, filling of the weld groove 4 with welding material takes place in more than one welding step.

A welding gun 6 is provided for performing the welding operation; in the illustrated example, the gun is mounted via a holder 7 to a robot arm 8 and is moved by the latter. The welding wire 10 protrudes from the contact tip 9 of the welding gun 6, this wire projecting by the distance Y. This free wire length Y is also called "stick-out".

Furthermore, an initiator 11, or a feeler roller, not shown, is provided, detecting a characteristic surface area or edge of one of the workpieces 1, 2 or 3—in the drawing, the area 12 of workpiece 1. The robot and thus the robot arm 8 are correspondingly controlled via the initiator 11 which latter can be, for example, a capacitive or inductive proximity switch by way of a control unit 13.

With a constant distance X of the welding gun 6 from the weld groove 4, the welding output, without altering the parameters for welding voltage and wire feeding speed, is dependent on the stick-out Y. A determination can be made, by measuring the welding amperage or the welding voltage and by comparing the thus-measured value with a set value for voltage or amperage previously fixed in dependence on the desired degree of filling of the weld groove 4, whether, at the selected welding output and speed of movement of the welding gun 6 along the weld groove 4, the desired degree of filling of the weld groove is attained, independently of its cross-sectional shape and/or size.

In case of deviations of the degree of filling from the desired value, the speed of movement is reduced (the desired degree of filling is not attained) or increased (the desired degree of filling is exceeded), and thus the degree of filling is kept constant.

It is also possible as an alternative or in addition to varying the speed of movement of the welding gun 6 to raise or reduce, as required, the welding output, for example by varying the welding voltage (or the welding current) and the speed of wire feed; in this procedure, an analogous change in the given set value (for example for the voltage) must be executed at the same time.

The theoretical bases for the process of this invention, permitting, without large expenditure, arc welding with constant filling of the weld groove, can be represented as follows:

The amount of material M introduced into a weld groove having a seam length ln is proportionate to the deposition output Wa performed.

$$M = k1 \cdot Wa \quad (1)$$

The deposition output Wa is the product of the deposition efficiency Pa delivered by the welding current source and the welding time ts.

$$Wa = k1 \cdot Pa \cdot ts \quad (2)$$

The deposition efficiency is obtained as a product of welding current I and welding voltage U.

$$Pa = U \cdot I \quad (3)$$

The welding time ts is the quotient from the seam length ln and the feeding speed vs of the welding gun.

$$ts = \frac{ln}{vs} \quad (4)$$

The following correlation results from Formulae 1, 2, 3 and 4 after substitution:

$$M = k1 \cdot ln \cdot \frac{U \cdot I}{vs} \quad (5)$$

Since the seam length ln under consideration is constant, it can be taken into account by a factor k2. In this case:

$$M = k2 \cdot \frac{U \cdot I}{vs} \quad (6)$$

Under the prerequisite that the welding voltage U is constant, the following dependency ensues for the welding current I:

$$I = k3 \cdot vd \quad (7)$$

In this connection, vd is the wire feeding speed and the factor k3 contains the wire diameter dd as well as the free wire length ld (stick-out, denoted by Y in the FIGURE).

The following dependency, exploited by the invention, can be derived from (6) and (7):

$$M = k4 \cdot \frac{U \cdot vd}{vs} \quad (8)$$

The relationship according to (8) demonstrates that the amount of material M introduced can be varied within wide limits by varying the values for the welding voltage U, the wire feeding speed vd, and the welding speed vs.

For the detection of the degree of filling by measuring technique, the relationship (7) can now be utilized, assuming a movement of the welding gun that is in parallel to the workpiece surface.

By inserting, for k3, the values for wire diameter dd and free wire length ld, the following is obtained:

$$I = k5 \cdot \frac{dd \cdot vd}{ld} \quad (9)$$

Since the wire diameter dd is constant, the relationship can also be expressed, with a constant wire feeding speed vd, as follows:

$$I = k6 \cdot \frac{I}{ld} \qquad (10)$$

It can be seen from (10) that the measured current I, with constant welding voltage U, constant wire diameter dd, and constant wire feeding speed vd, is dependent exclusively on the reciprocal value of the free wire length.

Since the free wire length ld (stick-out Y) is directly proportional to the spacing of the welding gun from the surface of the weld pool (a smaller spacing entails shorter stick-out due to increased burn-out, whereas a larger spacing entails a longer stick-out), the measured value for the welding current can be employed under these conditions (constant spacing x) as a yardstick for the level of the weld pool and thus also for the filling of the weld groove.

I claim:

1. Process for electric arc welding in which a surface of a pool of welding material is kept at a constant level in a weld seam with differing seam width and differing seam volume as a welding apparatus moves along a workpiece to be welded, comprising: establishing a predetermined value of welding current for said welding apparatus, corresponding to a desired degree of filling of a weld seam; measuring the actual welding current of said apparatus during a welding operation on a said seam; comparing the measured value of said actual welding current with said predetermined value, the measured value of the welding current directly varying with the height of filling of the weld seam; varying the speed of movement of said apparatus parallel to said seam in direct proportion to said actual welding current and thus the height of welding material in the groove, so that when the measured value of current is less than said predetermined value, the speed is decreased and when the measured value is greater than the predetermined value the speed is increased; continuously effecting the detection of the position of only a single portion at a time, of the surface of said workpiece as the apparatus moves therealong; continuously providing a control signal responsive to said detection; and continuously utilizing said control signal to keep the spacing of said apparatus from said weld seam constant.

2. Process for electric arc welding in which a surface of a pool of welding material is kept at a constant level in a weld seam with variable seam width and variable seam volume as a welding apparatus moves along a workpiece to be welded, comprising: establishing a predetermined value of welding current in said welding apparatus, corresponding to a desired degree of filling of a weld seam; measuring the actual welding current of said apparatus during a welding operation on a side seam; comparing said measured value of welding current with said predetermined value, said measured value of the welding current directly varying with the height of filling of the weld seam; varying the welding output of said apparatus in inverse proportion to said measured welding current and thus the height of welding material in said seam, so that when the measured value of welding current is less than the predetermined value, the welding output is increased and when the measured value of welding current is greater than the predetermined value, the welding output is decreased; continuously effecting the detection of the position of only a single portion at a time, of the surface of said workpiece as the apparatus moves therealong; continuously providing a control signal responsive to said detection; and continuously utilizing said control signal to keep the spacing of said apparatus from said welding seam constant.

3. A process as defined in claim 2, wherein when said welding output is varied, a corresponding change is made at the same time to said actual welding current.

4. A process as defined in claim 3, wherein said welding output is varied by varying the feed speed of welding wire to a contact tip of a welding gun.

5. A process as defined in claim 3, wherein said welding output is varied by varying the amount of said welding current.

6. A process as defined in claim 3, wherein said welding output is varied by varying the amount of the welding voltage.

* * * * *